No. 660,296.  
G. D. GREEN.  
MOTOR CYCLE.  
(Application filed July 9, 1900.)  
Patented Oct. 23, 1900.

(No Model.)

Witnesses,  
G. Willard Rich.  
D. E. Eaton.

Inventor:  
George D. Green,  
by Church & Church  
his Attorneys.

THE NORRIS PETERS CO., PHOTO-LITHO., WASHINGTON, D. C.

United States Patent Office.

GEORGE D. GREEN, OF ROCHESTER, NEW YORK, ASSIGNOR TO JAMES HENRY SAGER, OF SAME PLACE.

MOTOR-CYCLE.

SPECIFICATION forming part of Letters Patent No. 660,296, dated October 23, 1900.

Application filed July 9, 1900. Serial No. 23,025. (No model.)

*To all whom it may concern:*

Be it known that I, GEORGE D. GREEN, of Rochester, in the county of Monroe and State of New York, have invented certain new and useful Improvements in Motor-Cycles; and I do hereby declare the following to be a full, clear, and exact description of the same, reference being had to the accompanying drawings, forming a part of this specification, and to the reference-numerals marked thereon.

My present invention relates to motor-cycles, and has for its object to provide a frame particularly adapted for motor bicycles or machines that are liable to a fall which would tend to injure or disable the motor, said frame being of course capable of being coupled with several supporting-wheels, if desired, or coupled with any suitable framework to form a bicycle, tricycle, quadricycle, or polycycle.

To this end the invention consists in certain improvements in construction of the frame adapted not only to carry the motor in such a way that the center of gravity is near the ground, but to provide a device in which the motor and operating parts are effectually prevented from injury should the machine be overturned or otherwise subjected to hard usage, all as will be hereinafter described, the novel features being pointed out in the claims at the end of this specification.

Figure 1:
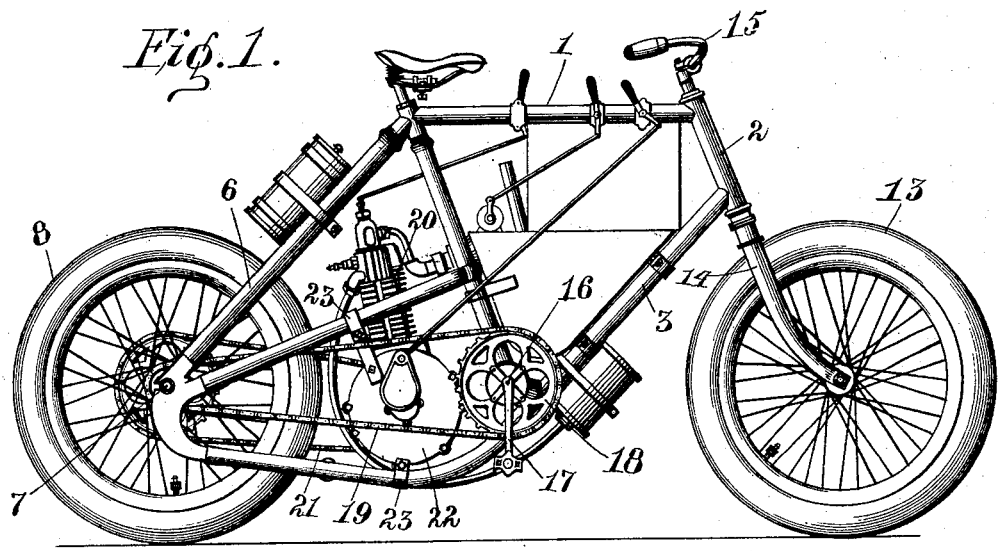
Figure 2:
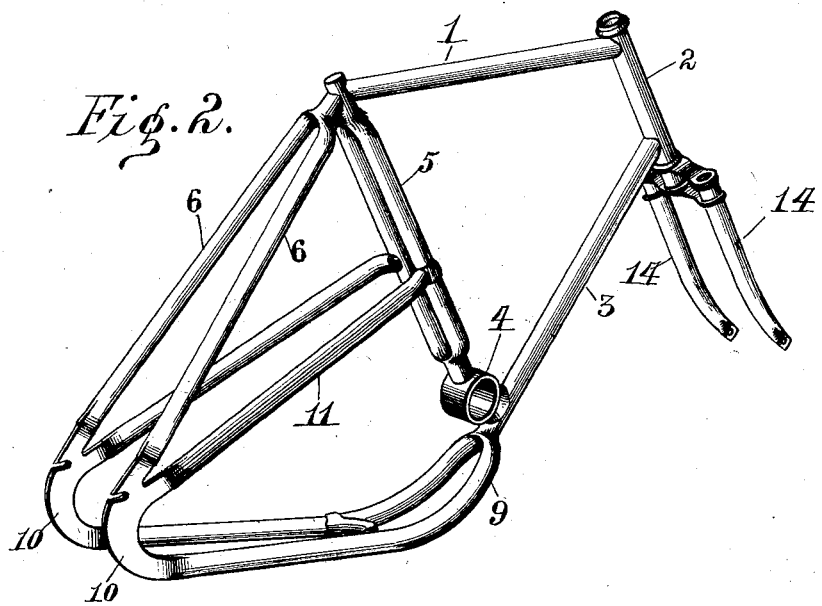

In the drawings, Figure 1 is a side elevation of a motor-bicycle embodying my improvements; Fig. 2, a perspective view of the frame thereof.

Similar reference-numerals in both figures indicate similar parts.

My improved frame is particularly adapted for use in connection with a motor-bicycle in which the action of the motor upon the propelling-wheel may be supplemented by the muscular exertions of the rider. When starting the machine, the vehicle may be propelled entirely by the rider, and I have therefore adopted a frame approximating the shape of the ordinary diamond bicycle-frame, although differing therefrom in some important particulars.

The frame of the machine, which is shown in Fig. 2, is constructed, as usual, of tubular material and embodies the upper substantially-horizontal tube or brace 1, connected at its forward end to the front inclined tube or brace 2, to the lower end of which latter is attached the rearwardly-inclined tube or brace 3, extending from the tube 2 downwardly and rearwardly, and to the lower portion thereof is attached the bearing or crank-hanger 4 at the lower end of the seat-post 5, which latter is connected at its upper end to the rear portion of the horizontal tube 1. The seat-post or support 5 I have shown as composed of two separate tubes or supports connected at their ends, and for the application of the form of motor shown in Fig. 1 prefer this; but it is not essential, and a single vertical tube could be employed, if desired.

6 indicates the upper rear fork of the frame, attached at its forward end to the top of the seat-post and extending downward on opposite sides of the rear or propelling wheel to the point of attachment to the axle 7 of said propelling-wheel, (indicated by 8,) journaled on said axle in any suitable manner.

9 indicates a fork connected to or forming part of the front inclined tube or brace 3 and extending from beneath the crank-hanger 4 some distance downwardly on a slight curve, as shown, and then rearwardly and upwardly to the point of connection with the rear axle 7, the rear end of this fork being formed with or rigidly attached to the plate or forging 10, which may, if desired, be formed with said lower fork 9 or with the upper rear fork 6, or it may be a separate plate brazed or otherwise attached to the forks. The furcations of the fork 9 are preferably connected intermediate their ends and forward of the propelling-wheel by a cross-brace 11, (shown in Fig. 2,) although this brace is not essential.

Extending from the rear connecting-plate or forging 10 to the seat-post 5 are the side rods or braces 11, constituting in effect a fork connected at its forward end to said seat-post. The forward or steering wheel 13 of the bicycle shown is mounted upon an axle in the ends of the fork 14, connected to a spindle or post extending through the bearing-tube 2 and having at the upper end suitable steering-handles 15.

16 indicates a crank-shaft provided with the pedals or cranks 17 and mounted in the shaft-hanger 4, said crank-shaft having a sprocket-wheel 18, around which passes a driving-chain 19, extending around the sprocket on the rear driving-wheel, the connection between the pedals and driving-wheel being preferably by ratchet mechanism of any approved type, so that the driving-wheel may operate independently of the pedals or cranks when desired.

20 indicates a motor adapted for driving the bicycle provided with a suitable rotary shaft connected by a chain 21 with a suitable sprocket or other engaging wheel 22, mounted upon or connected to the rear driving-wheel. This motor may be of any suitable construction and operated by steam, electricity, or other power; but in the present instance I have shown a gas-engine of a well-known type.

It will be noted that the motor itself is located entirely within the frame just above the lower fork 9, and its upper portion is effectually protected by the side braces 11. The driving-shaft of the motor is located below the center of the supporting-wheels 8 and 13, thus bringing the center of gravity low and preferably below the axles of the supporting-wheels and also below the pedal-shaft. The forward curved portion of the lower fork 9, which forms practically a continuation of the front inclined tube or brace 3, is beneath the motor and is so shaped that it will effectually protect the latter from any obstruction which may be encountered in riding, and the front portion being inclined or curved will ride over any such obstruction after the manner of a sled.

In the present embodiment the motor or engine frame is secured by clips or braces 23 with the lower fork 9 and also with the braces 11; but the manner of fastening may be changed as desired so long as the motor itself is located entirely within the skeleton frame embodying the braces 11 and fork 9, which effectually protect the operating parts from injury even if the machine should be thrown on its side.

The motor shown is a well-known type of explosive-gasolene engine, and the various appurtenances and attachments are indicated in convenient positions upon the frame; but as these form no portion of my invention no detailed description is deemed necessary and their construction and location might be varied without affecting my invention.

The frame shown with the motor inclosed therein could be, if desired, employed in connection with other forms of vehicles besides bicycles, although particularly adapted for this purpose, the rear end of the frame being supported upon a rear axle provided with one or more wheels located exteriorly of the rear forks to form, for instance, a tricycle, and though I prefer to employ a single front steering-wheel the front end of the frame could be connected rigidly or otherwise with any suitable support.

I claim as my invention—

1. In a motor-cycle, the combination with a rear axle and a driving-wheel, a frame embodying the seat-post, the lower fork extending downwardly and rearwardly from the lower end of said post and then upwardly to the supporting-axle, the two side braces extending from the rear axle to the post between its ends, and the upper fork extending from the axle to the upper end of the seat-post of a motor connected to the driving-wheel and located between the forks and the seat-post and the axle and between the side braces.

2. In a motor-cycle, the frame embodying the upper horizontal member, the front member, the seat-post, the lower inclined member connected to the front member extending downwardly below the end of the seat-post, a lower rear fork forming a continuation of the inclined member and then extending upwardly to the rear axle, the upper rear fork extending from the rear axle to the top of the seat-post, and the side braces extending from the rear axle to the seat-post intermediate its ends, in combination with the rear axle, and a driving-wheel, a driving-motor connected thereto and located between the seat-post and rear axle, above the lower rear fork and between the side braces.

3. In a motor-cycle, the frame embodying the upper horizontal member, the front member, the downwardly and rearwardly extending member connected to the lower end of the latter, the seat-post, the crank-hanger at the lower end of the latter, the lower fork extending below the crank-hanger and rearwardly and upwardly, the upper rear fork connected to the top of the seat-post and to the rear end of the lower fork, the side braces extending from the rear end of the lower fork to the seat-post intermediate its ends, in combination with a rear axle, a rear driving-wheel, a driving-motor having an operating-shaft connected to the rear wheel, said motor located between the rear forks and between the side braces, a crank-shaft having pedals thereon and located in the crank-hanger in the frame, and a connection between said crank-shaft and the rear driving-wheel.

4. In a motor-bicycle, the frame composed of the upper horizontal member, the front tube, the seat-post, the crank-hanger at the lower end thereof, the lower inclined front member extending from the front tube to the crank-hanger, the lower rear fork extending from the end of the last-mentioned member downwardly, rearwardly and upwardly, the upper fork extending from the end of the last-mentioned fork to the upper end of the seat-post, the side braces extending from the end of the lower fork to the post intermediate its ends, in combination with a rear axle, a driving-wheel on the axle between the rear forks, a driving-motor located between the side braces having an operating-shaft connected to the driving-wheel, a crank-shaft in the hanger connected to the driving-wheel, and a front fork, and a steering-wheel mounted thereon.

5. In a motor-bicycle, the combination with the front and rear axles, a frame having the upper rear fork and the lower rear forks, the seat-post and side braces extending from the rear ends of the forks to the seat-post intermediate the ends of the latter, said lower rear forks curving downwardly from the lower end of the seat-post, then extending rearwardly and upwardly to the rear axle, of a driving-motor located between the side braces having an operating-shaft arranged below the front and rear axles and connected to the rear wheel, and the rear driving-wheel on the rear axle.

GEORGE D. GREEN.

Witnesses:
G. WILLARD RICH,
G. A. RODA.